Figure 1:
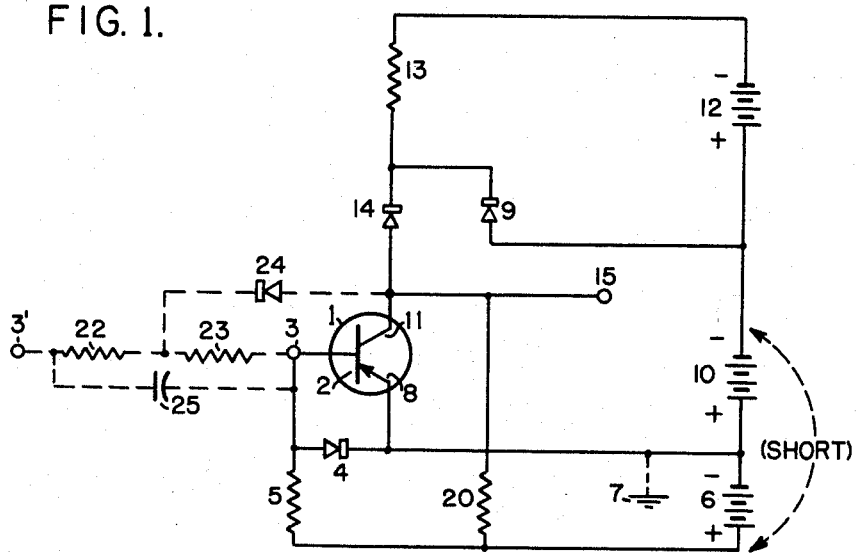

May 19, 1964  R. A. CEPUCH ETAL  3,134,033
PROTECTIVE ELECTRICAL NETWORK
Filed March 27, 1962

INVENTORS
ROBERT A. CEPUCH
GEORGE W. KOGER
BY *Harry R. Lubeke*
AGENT

United States Patent Office 3,134,033
Patented May 19, 1964

3,134,033
PROTECTIVE ELECTRICAL NETWORK
Robert A. Cepuch, Palos Verdes Estates, and George W. Koger, Santa Ana, Calif., assignors to Electronic Engineering Company of California, Santa Ana, Calif., a corporation of California
Filed Mar. 27, 1962, Ser. No. 183,695
7 Claims. (Cl. 307—88.5)

Our invention relates to electrical circuits and particularly to such circuits employing semiconductor elements in which additional semiconductor elements act to prevent destruction of elements of the electrical circuit.

Many circuits employing semiconductor elements are employed in present day electrical technology. This is particularly true where any type electrical computation or control is invoved. In any such circuits connections are made between transistors, diodes and sources of electrical energy. At times, unintentional shorts may occur between these elements, such as occasioned in servicing the apparatus. One such short might permanently damage a number of such circuits; for example, twenty-two in a computer-like apparatus in which we were working. Damage of this extent is of grave consequence in the field, where life and property may depend upon the continuing functioning of the apparatus involved, and is of at least important monetary value if this occurs in the laboratory or in an industry where replacement may more conveniently be made.

Accordingly, a simple protective network, added to the basic circuit, which makes such damage impossible is a highly important contribution to this art. Since the currents involved are relatively small, the usual kind of fuse of circuit-breaker protection is impractical. Furthermore, our protective network is self-resetting and is not damaged itself in carrying out the protection function.

In a semiconductor circuit employing a transistor and having at least one diode with an electrode of said diode connected to an electrode of said transistor and a source of activating electrical energy also connected to an electrode of said diode, we provide a protective circuit which comprises an additional diode, this diode being connected between the original diode and the electrode of the transistor in reversed polarity with respect to the polarity of the original diode. The additional diode largely performs the protective function, but introduces a negative overshoot in the waveform of the circuit. This we prevent by connecting a resistor of relatively high resistance value with respect to the other resistances in the circuit from the protected electrode of the transistor to the source of activating electrical energy to maintain a slight forward bias on the additional diode.

An object of our invention is to provide a self-protecting electrical circuit.

Another object is to provide a protective network for an electrical circuit that does not require resetting.

Another object is to provide a network that is effective in protecting an electrical circuit against direct shorts of power sources.

Another object is to provide a protective network that is relatively simple, small and inexpensive.

Another object is to provide a protective network for an electrical circuit that does not alter the functioning of the electrical circuit.

Other objects will become apparent upon reading the following detailed specification and upon examining the accompanying drawings, in which are set forth by way of illustration and example a typical embodiment of our invention.

Figures 2A, 2B:
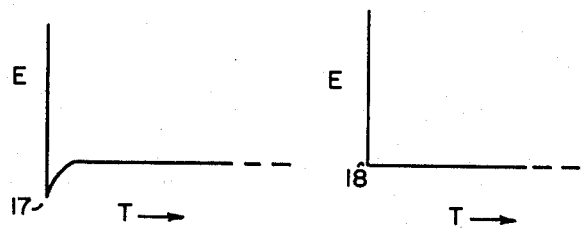

FIG. 1 shows a circuit diagram of a typical embodiment of our invention, including the protective network, and FIG. 2A shows an uncorrected and FIG. 2B a corrected waveform obtained from the apparatus of FIG. 1

In FIG. 1 there is shown the basic circuit for a number of circuits employing semiconductor elements; this circuit being for a so-called "inverter" in electronic computer terminology. That is, a signal pulse is inverted from a given polarity to the opposite polarity at the output of the inverter and the output pulse is one of greater power as compared with that of the original signal pulse.

In FIG. 1, numeral 1 indicates a transistor, which forms the major amplifying element of the circuit. While this transistor may be of any known type, we prefer ones having expitaxial mesa or surface barrier construction employing germanium and being of the PNP type. Such a transistor has the designation 2N964, as one example.

Transistor 1 has a base electrode 2, which is connected to the input terminal 3 of the basic circuit. This, in turn, is connected to the anode of diode 4, which diode limits the bias on the base electrode, and to one end of resistor 5, across which the bias appears. The opposite end of resistor 5 is connected to a source of activating electrical energy, shown as the positive terminal of battery 6 in FIG. 1.

The negative terminal of battery 6 connects to the cathode of diode 4. This connection may also be considered the common return connection of the circuit and when appropriate in relation to the other circuitry a ground 7 is here connected. The emitter 8 of transistor 1 is also connected to this common return connection. Diode 4 will be recognized as a base-emitter clamp diode, which makes possible higher frequency operation of the basic circuit than would be otherwise possible.

Diode 9 controls the off-voltage level of the output from the basic circuit. The anode thereof is connected to the negative voltage terminal of power source 10. The positive terminal of this source, shown as a battery, is connected to the common return previously mentioned as characterized by ground 7.

The collector 11 of transistor 1 is energized by a larger negative voltage obtained from a further power source, battery 12, of which the positive terminal is connected to the negative terminal of battery 10 and the negative terminal connects to one extremity of resistor 13. The other extremity of this resistor connects to the cathode of diode 9 and through our protective diode 14, from cathode to anode, to collector 11 of the transistor.

This completes the basic circuit, including the essential protection. However, it was found that the inclusion of protective diode 14, which will be noted as oppositely poled with respect to diode 9, caused a negative overthrow transient to appear at the output waveform. This output is taken at terminal 15, which connects directly to collector 11.

This transient is depicted in FIG. 2A, at 17, which shows the amplitude of electrical energy as a function of time, in the usual waveform manner. Transient 17 is undesirable in nearly all electronic technology and in the computer field it is recognized as "noise." A rectilinear output waveform, as shown at 18 in FIG. 2B is much to be preferred. This was attained by adding resistor 20 to the protective network. It connects from collector 11 of transistor 1 to the positive terminal of battery energizing power source 6.

The functioning is as follows. When transistor 1 ceases to pass current the collector 11 tends to experience the voltage overshoot shown at 17 in FIG. 2A because diode 14, which was formerly forward biased, is not now so biased and it acts like a capacitor. However, resistor 20 maintains a small value of forward current through diode 14, causing it to retain the electrical characteristic of a diode and not to assume the characteristic of a small capacitor. Thus, overshoot 17 does not occur, as evidenced by the experimental waveform showing at 13 in FIG. 2B.

We believe that our protective network has relatively broad application. For purposes of clarity and completeness, however, the exact functioning of the basic circuit shown in FIG. 1 is given below and the manner in which the protection occurs is made evident.

The circuit configuration of the transistor is of the grounded emitter type. The emitter references-back to the negative terminal of power supply 6, and ground 7, when the latter is employed. The voltage of base 2 is clamped across the base-emitter connection. This allows higher frequency operation of the basic circuit than would otherwise be possible. Collector 11 of the transistor is also clamped to a separate power supply 10 to control the level of the off-voltage excursion of the electrical output. Because of the negative connection of power supply 12 through resistor 13 and from cathode to anode of protection diode 14, the latter conducts during normal operation and so is "not there" as a significant circuit element.

Assume transistor 1 not to be conducting current. The base voltage is therefore controlled to a small positive reverse voltage by diode 4 and resistor 5 returning back to the positive terminal of power supply 6. The collector voltage is determined by the conduction of clamp diode 9 to the voltage at the junction of power supplies 10 and 12. In a typical embodiment each of the power supplies, or sources of activating electric power, may have a voltage of 6 volts. Thus, the output voltage for non-conduction of transistor 1 is minus 6 volts, and this appears at output terminal 15.

The transistor is forward-biased when an actuating pulse or electrical voltage level of approximately zero volt with respect to emitter 8 is impressed upon base 2. The transistor then conducts and the basic circuit takes the other of the two output voltage levels that it can assume. In this state of conduction the voltage of collector 11 is reduced from the previously clamped value of minus 6 volts to approximately zero volts because of the voltage drop in resistor 13. A potential of minus 0.4 volt with respect to the emitter potential is an actual "zero" voltage value in practice.

We consider now the protective mechanism of our network. It is well known that circuits such as have been considered are often constructed upon insulating "cards" with printed circuit wiring and that with such construction wiring terminals are often very close together. In servicing and testing such apparatus a screw driver, test clip or other conductor may easily inadvertently be caused to short two or more such terminals or portions of the wiring itself. A destructive short of this nature occurs when power supplies 6 and 10 are shorted; i.e., when the positive terminal of battery 6 is connected to the negative terminal of battery 10. See the dotted curved line "(short)" in FIG. 1.

These power entities, which have been variously termed herein as each being a "source of activating electrical energy," a "power supply" or a "battery," are usually actually an alternating to direct current rectifier-filter type of device. It is common practice to construct the same with internal circuit breaker means, which, upon an external short occurring opens the internal circuit and thus avoids damage thereto.

However, in circuits of the type of this invention where more than one power supply is employed, when two power supplies in series are shorted it is likely that only one will go to internal open circuit. When this has taken place the short is removed from the circuit as a whole and there is no circumstance acting to internally open the circuit of the second power supply. In FIG. 1, when power supply 10 opens internally due to the short and power supply 6 does not, but is the "surviving" power supply, the condition of serious and extended circuit damage to which we have previously referred is brought about.

What happens is that a voltage of plus 6 volts is impressed upon the anode of diode 9 because the short connects the lower terminal of supply 6 to the upper terminal of supply 10. Since this is the polarity to cause this diode to conduct, the internal resistance of the same is very low. Unless there are other circuit elements to limit the current it becomes great enough to destroy the diode. Assuming for the moment that our protective diode 14 is not present in the circuit, but that it is replaced by a conductor, the current passed by diode 9 continues through collector 11 to base 2 junction of transistor 1. This is forward biased and so also allows a destructive amplitude of current to flow. Furthermore, diode 4 is also forward biased under these conditions and so there is no current limiting at all around the whole circuit thus formed from and to power supply 6. We have found that under these circumstances the most probable failures are the shorting of diode 9 and the open-circuiting of transistor 1. These failures, of course, permanently destroy the usefulness of these relatively expensive circuit elements and result in complete inoperability of the basic circuit in which they are located.

When our protective network diode is in this otherwise very low resistance fault circuit it is seen that a relatively very high resistance is interposed. Diode 14 is in non-conducting polarity to the fault current and so only a very small amplitude of current, which is the leakage current for the diode, is allowed to flow. This produces only about one milliwatt of power dissipation in the otherwise vulnerable elements previously recited, thus protecting them completely.

Our protective resistor 20 is provided to maintain rectangularity of output waveform, as has been described. It will be noted that this resistor also conducts the positive voltage previously mentioned as the fault condition to the collector 11 of the transistor. However, this resistive feed is of no consequence, since the resistance value of the resistor 20 is relatively very high. In typical embodiments it is greater than the sum of the resistances of all of the other resistors in the basic circuit. Thus, the current flow through resistor 20 is very small and this aspect of our protective network does not have practical significance.

Typical values of resistance in the basic circuit are; for resistor 5, within the range of from 4,700 to 6,200 ohms; for resistor 13, within the range of from 250 to 750 ohms; and for protective resistor 20, of the order of 10,000 ohms.

It will be understood that our protective network has principally to do with the basic or output part of the inverter circuit shown in full lines in FIG. 1. It is customary to employ an input circuit also and for sake of completeness this has been shown in dotted connection lines in FIG. 1. In this input part, resistors 22 and 23 provide a direct current path between the input terminal 3' and terminal 3 of the basic circuit, the latter terminal being connected to the base of transistor 1, element 2.

Resistor 23 and diode 24 are used to prevent transistor 1 from going into saturation. Diode 24 connects from the junction between resistors 22 and 23 to the collector 11 of the transistor, with the anode of the diode connected to the collector. Capacitor 25 is a typical commuting capacitor, employed to provide an overdrive for turning on and turning off transistor 1 during the input voltage excursions. The input circuit changes the input voltage to a current for a passage by base 2 of the transistor, or for passage by diode 4, depending upon the on-off status of the basic circuit. The resistance of resistor 22 is within the range of from 1,000 to 1,500 ohms, while that for resistor 23 is of the order of 200 ohms. Capacitor 25 has a capacitance within the range of 33 to 47 micro-microfarads.

All the diodes in the circuit; 4, 9, 14, 24, are of the high-speed small glass package construction when rapid switching rates are to be accomplished, as in the 10 megacycle range of operation for the circuit. Such diodes have a response time of two nanoseconds from forward bias to near reverse bias. Typically, the diodes and transistor 1 are of the germanium type, although these may be of the silicon type just as well. While the 2N964 type has been mentioned as suitable it will be understood that a large departure may be taken from this type depending upon the operating characteristics expected of the basic circuit. This is a matter relatively independent of the protection phase of the circuit.

The anti-saturation elements 23, 24 are inactive as long as collector 11 is clamped for negative voltage output for the basic circuit; i.e. minus 6 volts in the present embodiment. Diode 24 is then reverse biased. However, when the input voltage is negative, as minus 6 volts, current through resistors 22, 23 and 5 allows the base to emitter junction of transistor 1 to be forward biased and to conduct sufficient current to cause the collector to be reduced to approximately the emitter potential, or zero volts, and the collector current flows through diode 14 and resistor 13, returning through power supplies 12 and 10 back to the emitter. If the collector current, or if the beta of the transistor is such that the transistor would attempt to go into saturation, this being the condition where the internal collector-base diode of the transistor becomes forward biased, then diode 24 also becomes forward biased. This causes part of the input drive to be bypassed through diode 24 and through the rest of the basic transistor circuit without acting to control the transistor.

While one (dotted) input circuit has been illustrated and described it is to be understood that this part of the circuit may have many variations as may be required by the art and still not affect the performance of our protective network. Also, we prefer to construct these whole circuits on cards with printed or etched circuit connections in order that the capacitance of such connections will be at a minimum and so that the circuit will perform at the highest speed possible. This type of construction is not mandatory and the usual conductor wired type, the welded conductor type or even the microminiature type may be employed.

Our protective network functions whenever a combination of semiconductor devices and power sources are connected such that a malconnection causes abnormally large currents to flow through the semiconductor devices were our network not present.

It will also be understood that the basic circuit illustrated, while constituting an "inverter" per se, is also a fundamental part of the known "flip-flop" circuit. For the latter, two of the basic circuits are employed and the output of the second is fed back to the input of the first. So, also, for an "amplifier," in which two circuits are employed but the output of the second is not fed back to the first circuit, but to a further circuit.

It is thus seen that a conventional electronic computer may contain thousands of basic circuits. Our protective network, which makes such circuits indestructable as to the most common and serious type of hazard that can come upon them, is thus seen to be extremely important.

While a high computing speed type of basic circuit has been illustrated in FIG. 1, operable in the nanosecond range, this type of circuit and such rapid operation are not essential to our protection scheme. The circuit may well operate in the hundred thousand cycles per second range and the transistors and diodes may be of relatively usual types.

Although specific examples and values for the several circuit elements have been given in this specification to illustrate the invention, it is to be understood that these are by way of example only and that reasonably wide departures can be taken therefrom without departing from the inventive concept. Other modifications of the circuit elements, details of circuit connections and alteration of the coactive relation between the elements may also be taken under our invention.

Having thus fully described our invention and the manner in which it is to be practiced, we claim:

1. In an electrical switching circuit having
    (a) a transistor with an output electrode,
    (b) a diode and
    (c) a source of electrical energy having first and second terminals,
    (d) the anode of said diode connected to said first terminal of said source of electrical energy;
    (e) in combination, a protective circuit operative upon the effective interchange of said first and second terminals of said source of electrical energy comprising;
    (f) an additional diode connected to the cathode of the first said diode and said output electrode of said transistor,
    (g) said additional diode connected in opposite polarity to the polarity of the first said diode, and
    (h) an impedance connected to said additional diode and to said second terminal of said source of electrical energy to maintain a forward bias on said additional diode.

2. In an electrical circuit having
    (a) a transistor,
    (b) at least one diode,
    (c) a first source of electrical energy having first and second terminals for energizing said transistor,
    (d) a second source of electrical energy for also energizing said transistor, and
    (e) an impedance,
    (f) one electrode of said one diode connected to the first terminal of said first source of electrical energy,
    (g) said second source of electrical energy and said impedance connected in series across said one diode;
    (h) in combination, a protective circuit operative upon the effective interchange of said first and second terminals of said first source of electrical energy comprising;
    (i) an additional diode connected to the other electrode of said one diode and to the collector electrode of said transistor,
    (j) said additional diode connected ni opposite polarity to the polarity of said one diode.

3. In an electrical circuit having
    (a) a transistor,
    (b) a diode having an anode and a cathode, and
    (c) a source of electrical energy having first and second terminals,
    (d) the anode of said diode connected to the first terminal of said source of electrical energy,
    (e) in combination, a protective network operative upon the effective interchange of said first and second terminals of said source of electrical energy comprising;
    (f) an additional diode connected between the cathode of the first said diode and the collector of said transistor,
    (g) said additional diode connected in opposite electrical polarity to the polarity of the first said diode, and
    (h) a resistor connected to said additional diode and to the second terminal of said source of electrical energy to maintain a slight forward bias on said additional diode.

4. In an electrical circuit having
    (a) a transistor having an output electrode,
    (b) a source of electrical energy for energizing said transistor,
    (c) a first diode connected to said source of electrical energy, and
    (d) and an input circuit including a second diode connected to the output electrode of said transistor;
    (e) in combination, a protective circuit operative upon the effective reversal of polarity of said source of electrical energy comprising;

(f) a third diode connected between said first diode and the output electrode of said transistor, (g) said third diode connected in opposite polarity to the polarity of said first diode, and (h) an impedance connected to said third diode and to said source of electrical energy to maintain a forward bias on said third diode.

5. In an electrical circuit having (a) a transistor, (b) a first diode connected between first and second electrodes of said transistor, (c) means to provide an electrical bias between said first and second electrodes of said transistor, (d) a second diode, and (e) an activating source of electrical energy connected to said second diode;

(f) in combination, a protective network operative upon the effective reversal of polarity of said activating source comprising;

(g) a third diode connected in series with said second diode in opposite polarity thereto and also connected to a third electrode of said transistor, and (h) an impedance connected from said third electrode of said transistor to said means to provide an electrical bias to maintain a small forward current through said third diode.

6. In an electronic computer circuit having (a) a transistor, (b) a first diode connected between first and second electrodes of said transistor, (c) a first source of electrical energy, (d) a first impedance, (e) said first source and said first impedance connected in series across said first diode, (f) a second diode, (g) a second source of electrical energy connected to said second diode and to said second electrode of said transistor, and (h) a third source of electrical energy connected in series with said second source and through a second impedance to said second diode;

(i) in combination, a protective network operative upon the effective replacement of said second source of electrical energy by said first source at reversed polarity with respect to said second source comprising;

(j) a third diode connected to said second diode in opposite polarity thereto and to a third electrode of said transistor, and (k) a third impedance having a value of impedance in excess of the impedance values of said first or second impedances, (l) said third impedance connected from the junction of said first source of electrical energy and said first impedance to said third electrode of said transistor.

7. In an electrical switching circuit having (a) a transistor, (b) a first diode connected between the base and the emitter electrodes of said transistor, (c) a source of bias electrical energy with a first resistor in series therewith and these elements connected across said first diode, (d) a second diode, (e) a first activating source of electrical energy connected to the anode of said second diode, (f) said first activating source also connected to said emitter electrode, and (g) a further activating source of electrical energy connected in series with said first activating source and through a second resistor to the cathode of said second diode;

(h) in combination, a protective network operative upon the effective reversal of polarity of said first activating source comprising;

(i) a third diode connected to said second diode in opposite polarity thereto and to the collector electrode of said transistor, and (j) a third resistor having a resistance value in excess of the sum of the resistance values of said first and second resistors, (k) said third resistor connected from the junction of said source of bias and said first resistor to said collector electrode of said transistor.

References Cited in the file of this patent
UNITED STATES PATENTS

| | | |
|---|---|---|
| 2,914,683 | Terry | Nov. 24, 1959 |
| 3,025,413 | Borden | Mar. 13, 1962 |
| 3,045,150 | Mann | July 17, 1962 |
| 3,049,630 | Sapino | Aug. 14, 1962 |

OTHER REFERENCES

Brown et al.: "Latching Threshold Detector," IBM Technical Disclosure Bulletin, vol. 4, No. 2, July 1961, pages 45 and 46.